UNITED STATES PATENT OFFICE.

CARLISLE K. ROOS AND MURRELL G. ALLISON, OF FORT DODGE, IOWA, ASSIGNORS TO UNITED STATES GYPSUM COMPANY, OF CHICAGO, ILLINOIS, A CORPORATION OF ILLINOIS.

LIGHT-WEIGHT GYPSUM PRODUCTS.

No Drawing.   Application filed October 23, 1924.   Serial No. 745,419.

This invention relates to improvements in the production of plastic material and more particularly to light weight gypsum products.

Gypsum has been used for some time in the manufacture of roof tile, floor tile, partition block, plaster board and wallboard and it is an object of this invention to increase the fire resisting or insulating qualities or structural strength and reduce the weight.

In accordance with this invention a small quantity, approximately less than five percent, of a soluble silicate, such as sodium silicate, is added to the gauging water with which calcined gypsum is mixed for producing gypsum articles which will bring about a marked increase in the consistency of the mass, or, in other words, it will require more water to bring the mass to the point of good working qualities. The quantity of water which the calcined gypsum will carry determines the weight per unit volume of the dried product. The function of the silicate is shown by the reaction

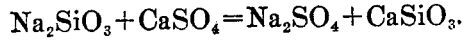

The product calcium silicate ($CaSiO_3$) is a gelatinous, insoluble compound which holds a large percentage of its weight as water. The fact that this compound absorbs a portion of the water used in gauging the calcined gypsum explains the rise in a consistency of the mixture. The method of utilizing this reaction is very simple. A solution of sodium silicate is simply added to the gauging water to which the calcined gypsum is added in sufficient quantities to obtain good working qualities or normal consistency. The calcium silicate formed by the reaction is very intimately and homogeneously dispersed throughout the mass. The wet mass may be handled in the same way that an ordinary mix of gypsum and water is used and no marked difference in the setting properties of the material is noted. The silicate seems to bring about a slight acceleration of the set of the gypsum but it is not marked enough to necessitate the addition of a retarder.

The use of 2.3 parts by weight of a solution of sodium silicate to 100 parts of calcined gypsum will raise the consistency from 76 cc. $H_2O$ to 85 cc., and at the same time the bulk of the mass is considerably increased due to the voluminous gelatinous precipitate of calcium silicate. The above proportions will produce a wallboard weighing about 1700 pounds per 1000 sq. ft. The decrease in weight of the dried product is approximately proportional to the quantity of silicate used. The strength of the set material is somewhat reduced by additions of sodium silicate in excess of 5%, due to the large percentage of inert calcium silicate content, but the use of more than this quantity appears to be unnecessary.

What we claim is:

1. A composition of matter composed of one hundred parts of hydrated calcium sulphate combined with about 2.3 parts of sodium silicate and water resulting in an expanded bulk of calcium sulphate containing sodium sulphate, calcium silicate and water.

2. The process for increasing the bulk and decreasing the weight of gypsum products which consists in adding 2.3 parts by weight of a solution of sodium silicate to the gauging water therefor, in mixing it with one hundred parts of calcined gypsum, in rendering plastic the gypsum and forming the product of the resultant mass, and in allowing it to set.

CARLISLE K. ROOS.
MURRELL G. ALLISON.